United States Patent
Zhang et al.

(10) Patent No.: US 9,990,529 B2
(45) Date of Patent: Jun. 5, 2018

(54) SENSOR FOR DETECTING FINGERPRINT AND IDENTIFICATION APPARATUS AND CONTROLLING METHOD OF SENSOR FOR DETECTING FINGERPRINT

(71) Applicant: BYD COMPANY LIMITED, Shenzhen (CN)

(72) Inventors: Zibao Zhang, Shenzhen (CN); Jie Zhang, Shenzhen (CN); Yun Yang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days. days.

(21) Appl. No.: 15/192,814

(22) Filed: Jun. 24, 2016

(65) Prior Publication Data

US 2016/0307020 A1    Oct. 20, 2016

Related U.S. Application Data

(63) Continuation of application No. PCT/CN2014/095423, filed on Dec. 29, 2014.

(30) Foreign Application Priority Data

Dec. 30, 2013 (CN) .......................... 2013 1 0744446
Dec. 30, 2013 (CN) ..................... 2013 2 0881878 U (51) Int. Cl.
*G06K 9/00* (2006.01)
(52) U.S. Cl.
CPC .................................. *G06K 9/0002* (2013.01)

(58) Field of Classification Search
CPC ............. G06K 9/0002; G06K 9/00013; G06K 9/0008; G06F 17/30241; G06F 21/32; G06F 21/316; G06F 3/044
See application file for complete search history.

(56) References Cited

U.S. PATENT DOCUMENTS 6,330,145 B1   12/2001 Lepert et al.
6,501,284 B1   12/2002 Gozzini
(Continued)

FOREIGN PATENT DOCUMENTS

CN        1564189 A      1/2005
CN      101097598 A      1/2008
(Continued)

OTHER PUBLICATIONS

Extended European Search Report for corresponding European Application No. 14874728.0 dated Jul. 31, 2017, 10 pages.
(Continued)

*Primary Examiner* — Amir Alavi
(74) *Attorney, Agent, or Firm* — Alston & Bird LLP (57) ABSTRACT

A sensor for detecting a fingerprint, a fingerprint identification apparatus and a controlling method of a sensor for detecting a fingerprint are provided. The sensor for detecting the fingerprint includes a detecting panel including: a detecting region with a plurality of detecting units, in which the plurality of detecting units are distributed in a plurality rows and columns on the detecting region; and a conductive layer, configured to form a sensing capacitance between the conductive layer and a finger when the finger is close to the detecting region; a capacitance detecting module, configured to detect the sensing capacitance; and a control module.

17 Claims, 6 Drawing Sheets

(56) References Cited

U.S. PATENT DOCUMENTS

| | | | |
|---|---|---|---|
| 6,555,888 | B2 | 4/2003 | Lepert et al. |
| 6,636,053 | B1 | 10/2003 | Gozzini |
| 6,681,033 | B1 | 1/2004 | Yano et al. |
| 7,127,089 | B2 | 10/2006 | Miyasaka |
| 7,583,826 | B2 | 9/2009 | Nakamura et al. |
| 2001/0031074 | A1 | 10/2001 | Yamazaki |
| 2002/0054695 | A1 | 5/2002 | Bjorn et al. |
| 2003/0099380 | A1 | 5/2003 | Gozzini |
| 2003/0165261 | A1 | 9/2003 | Johansen et al. |
| 2005/0073324 | A1 | 4/2005 | Umeda et al. |
| 2005/0078856 | A1 | 4/2005 | Miyasaka et al. |
| 2005/0141048 | A1 | 6/2005 | Mizutani |
| 2005/0179446 | A1* | 8/2005 | Hara ............... G06K 9/0002 324/662 |
| 2005/0226478 | A1 | 10/2005 | Fujiyoshi |
| 2005/0259850 | A1 | 11/2005 | Shimamura et al. |
| 2007/0075710 | A1 | 4/2007 | Hargreaves et al. |
| 2007/0286464 | A1* | 12/2007 | Jayanetti ......... G06K 9/00013 382/124 |
| 2008/0069413 | A1 | 3/2008 | Riedijk et al. |
| 2008/0079100 | A1 | 4/2008 | Manansala |
| 2009/0123039 | A1 | 5/2009 | Gozzini |
| 2009/0322700 | A1 | 12/2009 | D'Souza et al. |
| 2011/0223888 | A1* | 9/2011 | Esaki ............... G06F 21/32 455/411 |
| 2012/0319992 | A1* | 12/2012 | Lee ............... G06F 3/044 345/174 |
| 2013/0076485 | A1 | 3/2013 | Mullins |
| 2013/0271422 | A1 | 10/2013 | Hotelling et al. |
| 2014/0181937 | A1* | 6/2014 | Kokubun ......... H04L 63/0861 726/7 |
| 2016/0132712 | A1* | 5/2016 | Yang ............... G06K 9/0002 348/77 |
| 2016/0307019 | A1* | 10/2016 | Zhang ............. G06K 9/0002 |
| 2016/0307020 | A1* | 10/2016 | Zhang ............. G06K 9/0002 |
| 2017/0177620 | A1* | 6/2017 | Zhang ............. H04B 17/318 |
| 2017/0193209 | A1* | 7/2017 | Mohan ............. G06F 21/316 |

FOREIGN PATENT DOCUMENTS

| | | |
|---|---|---|
| CN | 101526988 A | 9/2009 |
| CN | 101727571 A | 6/2010 |
| CN | 101727575 A | 6/2010 |
| CN | 201716741 U | 1/2011 |
| CN | 202677425 U | 1/2013 |
| CN | 203102316 U | 7/2013 |
| CN | 203746088 U | 7/2014 |
| CN | 203964928 U | 11/2014 |
| EP | 1308878 | 5/2003 |
| WO | WO 2001/059692 A1 | 8/2001 |
| WO | WO 01/82237 | 11/2001 |

OTHER PUBLICATIONS

Extended European Search Report for corresponding European Application No. 14875903.8 dated Jun. 27, 2017, 8 pages.

International Search Report and Written Opinion for corresponding International Application No. PCT/CN2014/095423, dated Mar. 31, 2015, 9 pages.

International Search Report and Written Opinion of the International Searching Authority for International Patent Application No. PCT/CN2014/095134 dated Mar. 25, 2015, 9 pages.

Kwon, Y.-C. et al., *A Precision Mismatch Measurement Technique for Integrated Capacitor Array Using a Switched Capacitor Amplifier*, IEEE Transactions on Semiconductor Manufacturing, IEEE Service Center, vol. 26, No. 2 (May 2013) 226-232.

Liu et al., *A CMOS Micromachined Capacitive Sensor Array for Fingerprint Detection*, IEEE Sensors Journal, IEEE Service Center, vol. 12, No. 5 (May 2012) 1004-1010.

Nam, J.-M. et al., *Design and Implementation of 160×192 Pixel Array Capacitive-Type Fingerprint Sensor*, Circuits, Systems and Signal Processing., vol. 24, No. 4 (2004) 401-413.

Notice of Allowance for U.S. Appl. No. 15/192,807 dated Feb. 15, 2017, 14 pages.

Office Action for U.S. Appl. No. 15/192,807 dated Oct. 28, 2016, 11 pages.

Razavi, Behzad, *Introduction to Switched-Capacitor Circuits*, (Sep. 3, 2013), URL: https://web.archive.org/web/20130903011127if_/http://www.seas.ucla.edu:80/brweb/teaching/AIC_Ch12.pdf, (Jul. 20, 2017), 395-438.

Communication pursuant to Rule 114(2) EPC for corresponding European Application No. 14875903.8 dated Jan. 22, 2018, 7 pages.

* cited by examiner

SENSOR FOR DETECTING FINGERPRINT AND IDENTIFICATION APPARATUS AND CONTROLLING METHOD OF SENSOR FOR DETECTING FINGERPRINT

CROSS REFERENCE TO RELATED APPLICATIONS

This application is a continuation of International Application No. PCT/CN2014/095423, filed Dec. 29, 2014, which claims the benefit of Chinese Patent Application Nos. 201310744446.0, filed Dec. 30, 2013 and 201320881878.1, filed Dec. 30, 2013, each incorporated by reference herein.

FIELD

The present disclosure relates to the field of identification technology, and more particularly to a sensor for detecting a fingerprint, a fingerprint identification apparatus, and a method of controlling a sensor for detecting a fingerprint.

BACKGROUND

Generally, conductive sensors for detecting fingerprints are used in the field of identification. A conductive sensor for detecting fingerprints is usually configured to detect the fingerprints according to a sensing capacitance formed between a finger and a detecting panel. However, a fingerprint detecting mode is kept in an on state while waiting to detect the fingerprint, i.e., the detecting panel attempts to detect the fingerprint continuously, such that the fingerprint detection and judgment can be performed quickly when the finger is placed on the detecting panel.

However, in the process from the waiting to detect the fingerprint to completion of the fingerprint detection, the actual time occupied by the fingerprint detection is very short, and most of the time is spent detecting useless signals, which leads to a great waste of power consumption, thus resulting in a large power consumption by the detecting panel.

SUMMARY

Embodiments of the present disclosure seek to solve at least one of the problems existing in the related art to at least some extent.

According to a first aspect of the present disclosure, a sensor for detecting a fingerprint is provided. The sensor for detecting the fingerprint includes a detecting panel including: a detecting region with a plurality of detecting units, in which the plurality of detecting units are distributed in a plurality of rows and columns on the detecting region; and a conductive layer, configured to form a sensing capacitance between the conductive layer and a finger when the finger is close to the detecting region; a capacitance detecting module, configured to detect the sensing capacitance; and a control module, connected with the plurality of detecting units, the conductive layer and the capacitance detecting module respectively and configured to determine whether a distance between the finger and the plurality of detecting units is less than a predetermined threshold according to a change trend of the sensing capacitance and to control the plurality of detecting units to scan the fingerprint when the distance between the finger and the plurality of detecting units is less than the predetermined threshold.

With the sensor for detecting the fingerprint according to embodiments of the present disclosure, by using the conductive layer, the sensing capacitance is formed between the conductive layer and the finger when the finger is close to the detecting panel. When the finger is closer and closer to the detecting region, the sensing capacitance formed between the conductive layer and the finger becomes larger and larger. Therefore, the distance between the finger and the plurality of detecting units is determined according to the change trend of the sensing capacitance. When the distance between the finger and the plurality of detecting units is small, there is an intention for scanning the fingerprint of the finger by the sensor and the plurality of detecting units are controlled to scan the fingerprint; when the distance between the finger and the plurality of detecting units is large, the plurality of detecting units are controlled to stop scanning, which can effectively reduce the working time of the plurality of detecting units and reduce the power consumption of the detecting units, and thus the sensor has advantages of a low power consumption, energy-saving, and a high detection accuracy.

According to a second aspect of the present disclosure, a fingerprint identification apparatus is provided. The fingerprint identification apparatus includes the sensor for detecting a fingerprint according to the first aspect of the present disclosure.

With the fingerprint identification apparatus according to embodiments of the present disclosure, by using the conductive layer, the sensing capacitance is formed between the conductive layer and the finger when the finger is close to the detecting panel. When the finger is closer and closer to the detecting region, the sensing capacitance formed between the conductive layer and the finger becomes larger and larger. Therefore, the distance between the finger and the plurality of detecting units is determined according to the change trend of the sensing capacitance. When the distance between the finger and the plurality of detecting units is small, there is an intention for scanning the fingerprint of the finger by the sensor and the plurality of detecting units are controlled to scan the fingerprint; when the distance between the finger and the plurality of detecting units is large, the plurality of detecting units are controlled to stop scanning, which can effectively reduce the working timing of the plurality of detecting units and reduce the power consumption of the detecting units, and thus the sensor has the advantages of the low power consumption, energy-saving, and the high detection accuracy.

According to a third aspect of the present disclosure, a method of controlling a sensor for detecting a fingerprint is provided. The method of controlling the sensor for detecting the fingerprint includes: detecting a sensing capacitance formed between a conductive layer and a finger; determining whether a distance between the finger and a plurality of detecting units is less than a predetermined threshold according to a change trend of the sensing capacitance; and controlling the plurality of detecting units to scan the fingerprint, when the distance between the finger and the plurality of detecting units is less than the predetermined threshold.

With the method of controlling the sensor for detecting the fingerprint according to embodiments of the present disclosure, by using the conductive layer, the sensing capacitance is formed between the conductive layer and the finger when the finger is close to the detecting panel. When the finger is closer and closer to the detecting region, the sensing capacitance formed between the conductive layer and the finger becomes larger and larger. Therefore, the distance between the finger and the plurality of detecting units is determined according to the change trend of the sensing capacitance. When the distance between the finger and the plurality of detecting units is small, there is an intention for scanning the fingerprint of the finger by the sensor and the plurality of detecting units are controlled to scan the fingerprint; when the distance between the finger and the plurality of detecting units is large, the plurality of detecting units are controlled to stop scanning, which can effectively reduce the working timing of the plurality of detecting units and reduce the power consumption of the detecting units, thus providing the advantages of the low power consumption, energy-saving, and the high detection accuracy.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

Figure 1:
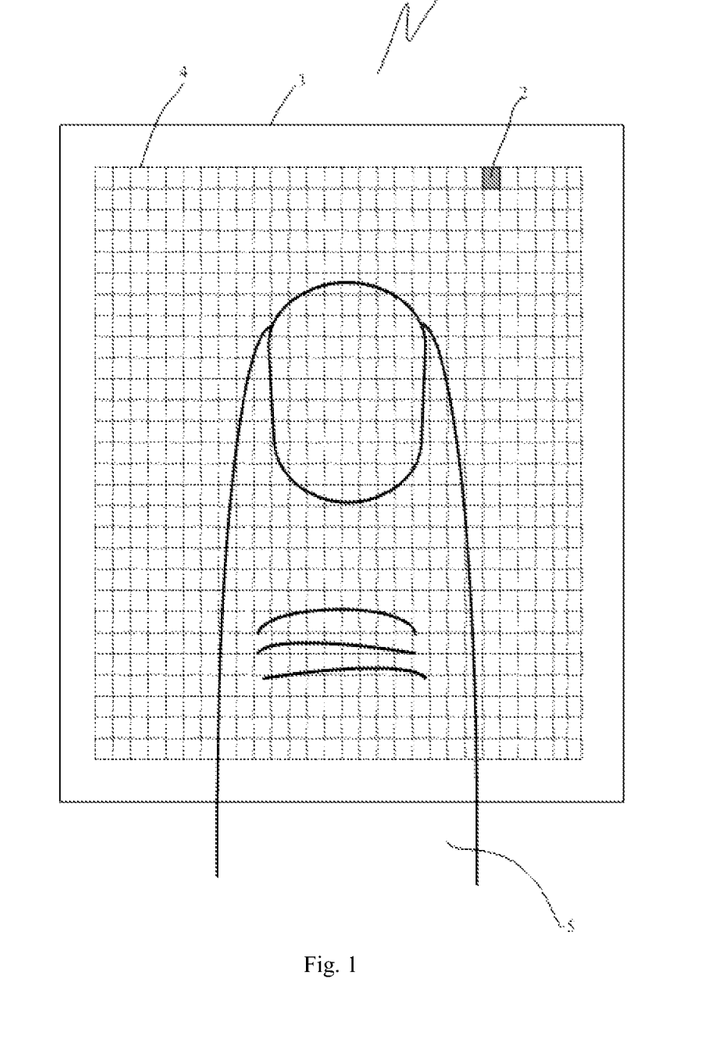
FIG. 1 is a schematic diagram of a sensor for detecting a fingerprint.

FIG. 1 shows a sensor for detecting a fingerprint. The sensor 1 for detecting the fingerprint includes a detecting region 4 and a detecting sensor border 3. The detecting sensor border 3 is used to transmit an excitation signal to a finger 5. The detecting region 4 includes a plurality of detecting pixels 2, and each detecting pixel 2 is used to perform a fingerprint detection. When the sensor 1 is in a working mode, the plurality of detecting pixels 2 distributed in the detecting region 4 scan a fingerprint of the finger 5 to distinguish a ridge and a valley of the fingerprint so as to obtain an image signal of the fingerprint. The detecting pixel 2 completes the fingerprint detection and amplification of the image signal. Since a resolution of the detecting pixel 2 is larger than a fingerprint resolution, the plurality of detecting pixels 2 are distributed in the detecting region 4 to meet a resolution requirement of a fingerprint image. However, a fingerprint detecting mode is normally in an on state while waiting to detect the fingerprint, i.e., the plurality of detecting pixels 2 in the detecting region 4 attempt to detect the fingerprint continuously, such that the fingerprint detection and judgment can be performed quickly when the finger is placed on the detecting panel. However, in a process from the stage of waiting to detect the fingerprint to a completion of the fingerprint detection, actual time occupied by the fingerprint detection is very short, and most of the time is used to detect useless signals, which leads to a great waste of power consumption, thus resulting in a large power consumption by the plurality of detecting pixels 2 in the detecting region 4.

In the following, a sensor for detecting a fingerprint, a fingerprint identification apparatus and a controlling method of a sensor for detecting a fingerprint will be described in detail with reference to FIG. 2 to FIG. 7.

Figure 2:
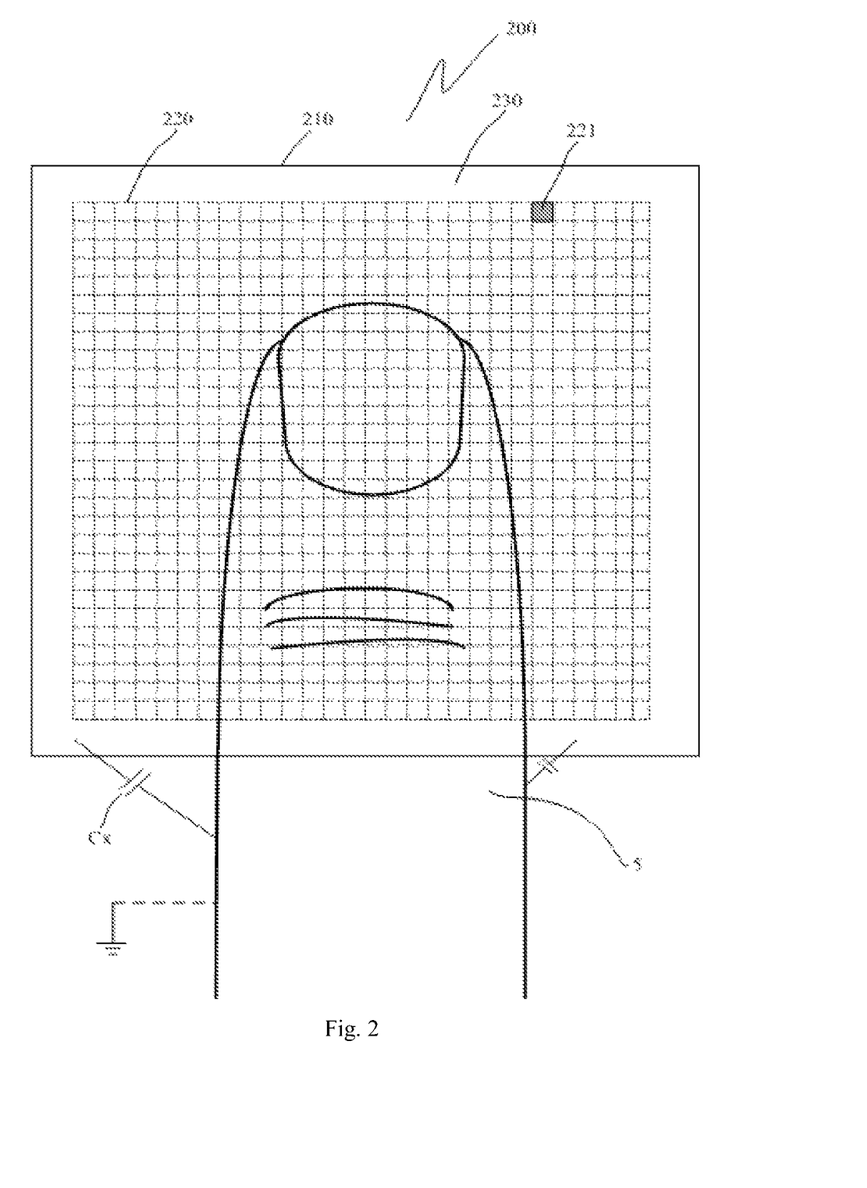
FIG. 2 is a schematic diagram of a sensor for detecting a fingerprint according to an embodiment of the present disclosure.
Figure 3:
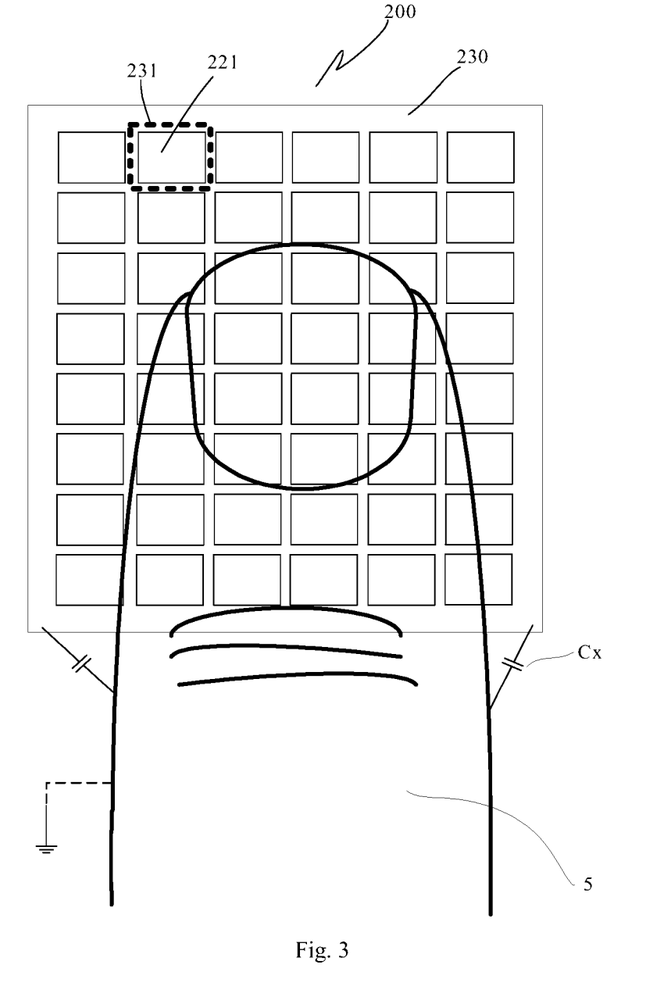
FIG. 3 is a schematic diagram of a sensor for detecting a fingerprint according to another embodiment of the present disclosure.
Figure 4:
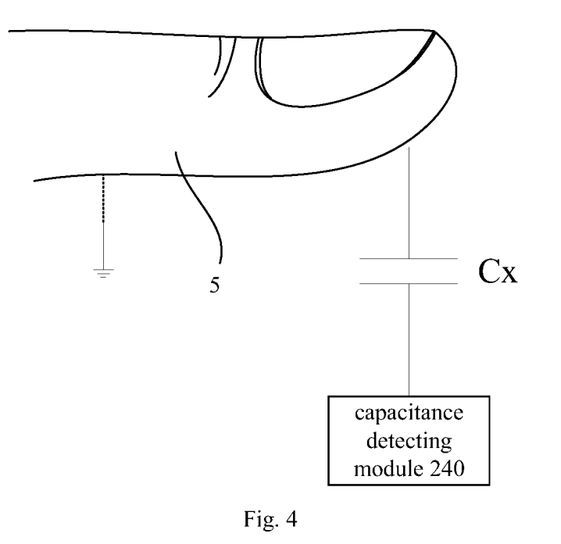
FIG. 4 is a schematic diagram of a sensor for detecting a fingerprint based on detecting whether a finger is close to a detecting panel according to an embodiment of the present disclosure.
Figure 7:
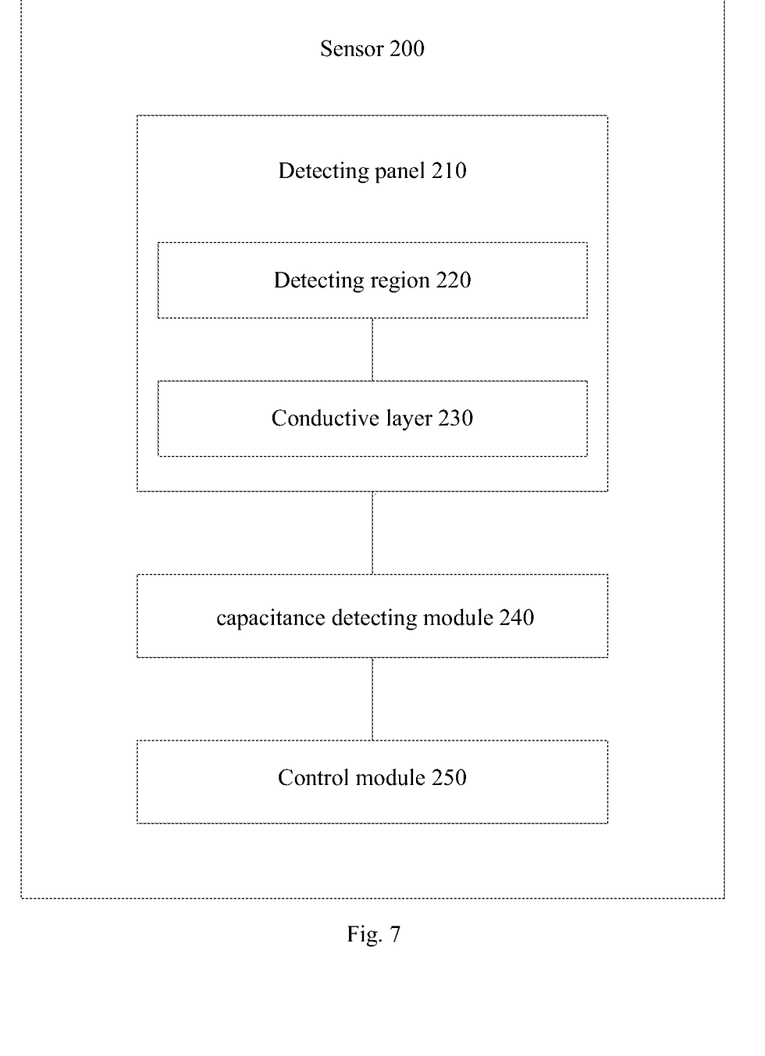
FIG. 7 is a block diagram of a sensor for detecting a fingerprint according to an embodiment of the present disclosure.

FIG. 2 is a schematic diagram of a sensor for detecting a fingerprint according to an embodiment of the present disclosure. FIG. 3 is a schematic diagram of a sensor for detecting a fingerprint according to another embodiment of the present disclosure. FIG. 4 is a schematic diagram of a sensor for detecting a fingerprint based on detecting whether a finger is close to a detecting panel according to an embodiment of the present disclosure. FIG. 7 is a block diagram of a sensor for detecting a fingerprint according to an embodiment of the present disclosure.

In an embodiment of the present disclosure, as shown in FIGS. 2-4 and 7, the sensor 200 for detecting the fingerprint includes a detecting panel 210, a capacitance detecting module 240 and a control module 250. The detecting panel 210 includes a detecting region 220 and a conductive layer 230.

The detecting region 220 is located on the detecting panel 210 and includes a plurality of detecting units 221. The plurality of detecting units 221 are distributed in a plurality of rows and columns on the detecting region 220. The conductive layer 230 is located on the detecting panel 210 and is configured to form a sensing capacitance $C_x$ between the conductive layer 230 and a finger when the finger is close to the detecting region 220. The capacitance detecting module 240 is configured to detect the sensing capacitance $C_x$. The control module 250 is connected with the plurality of detecting units 221, the conductive layer 230 and the capacitance detecting module 240 respectively and is configured to control the plurality of detecting units 221 to scan the fingerprint, when a distance between the finger 5 and the plurality of detecting units 221 is less than a predetermined threshold.

In some embodiments, the control module 250 further controls the plurality of detecting units 221 to stop scanning, when the distance between the finger and the plurality of detecting units 221 is larger than or equal to the predetermined threshold (e.g. 1 cm).

Combined with FIG. 4, an operation principle of the sensor 200 for detecting the fingerprint is described in the following.

As shown in FIGS. 2-4, according to a human model, a finger 5, equal to a ground potential (GND), is configured as an upper plate electrode of the sensing capacitance $C_x$, and the conductive layer 230 under or around the detecting region 220 is configured as a lower plate electrode of the sensing capacitance $C_x$. When there is no finger 5 above the detecting region 220, the sensing capacitance $C_x$ tends to be infinitely small; when the finger 5 is close to the detecting region 220, the sensing capacitor $C_x$ is formed between the finger 5 and the conductive layer 230. It may be determined whether the finger 5 is close to the detecting region 220 by detecting changes of the sensing capacitance $C_x$ by the capacitance detecting module 240.

From the above, the sensing capacitance $C_x$ is detected by the conductive layer 230 and the capacitance detecting module 240 (e.g., the capacitance detecting module 240 is implemented by a detecting circuit). Moreover, because the sensing capacitance is in inverse proportion to the distance between the finger and the plurality of detecting units, whether the finger 5 is closer and closer to the detecting region 220 is determined according to the change trend of sensing capacitance $C_x$, i.e., whether to detect the fingerprint by the fingerprint detection region 220 is determined according to the change trend of sensing capacitance $C_x$. When the finger 5 is closer and closer to the detecting region 220, for example when the distance between the finger 5 and the plurality of detecting units 221 is less than the predetermined threshold (e.g. 1 cm), the detecting region 220 is controlled to detect the fingerprint.

As shown in FIGS. 2-4, in order to improve a detection accuracy of the sensor 200 for detecting the fingerprint, the control module 250 further controls the conductive layer 230 to be grounded (GND) or to be connected with a predetermined potential, when the distance between the finger 5 and the plurality of detecting units 221 is less than the predetermined threshold (e.g. 1 cm), which isolates and shields the detecting region 220 and reduces interferences to the detecting region 220 from external signals, thus enhancing the detection accuracy of the sensor 200 for detecting the fingerprint.

In an embodiment of the present disclosure, as shown in FIG. 2, in order to isolate and shield the detecting region 220 effectively by the conductive layer 230, the conductive layer 230 is disposed around the detecting region 220.

Specifically, the conductive layer 230 is distributed around the detecting region 220, when the finger 5 is located above the detecting region 220, the sensing capacitance $C_x$ is formed between the finger 5 and the conductive layer 230, and thus it is determined whether the finger 5 is located above the detecting region 220 by detecting the sensing capacitance $C_x$.

From the above, the conductive layer 230 is distributed around the detecting region 220, so that the conductive layer 230 is connected to a fixed potential (e.g. to be grounded or to be connected with the predetermined potential), when the detecting region 220 is controlled to scan the fingerprint, which can isolate and shield the detecting region 220 and reduce the interferences to the detecting region 220 from the external signals, thus enhancing the detection accuracy of the sensor 200 for detecting the fingerprint.

In another embodiment of the present disclosure, as shown in FIG. 3, in order to isolate and shield the detecting region 220 better, the conductive layer 230 may include a plurality of conductive boxes 231 distributed in the plurality of rows and columns, and each detecting unit 221 is disposed in a corresponding conductive box 231.

In other words, since the conductive layer 230 is distributed around each detecting unit 221 of the entire detecting region 220, it is more sensitive for the conductive layer 230 to sense the sensing capacitance $C_x$ between the finger 5 and the detecting panel 210, and the conductive layer 230 may be connected to a fixed potential (e.g. to be grounded or to be connected with the predetermined potential), when the detecting region 220 is controlled to scan the fingerprint. Moreover, since the conductive layer 230 is distributed around each detecting unit 221, the detecting region 220 may not only be shielded against the interferences from the external signals, but also be shielded against interferences from adjacent detecting units 221, thus enhancing the detection accuracy of the sensor 200 for detecting the fingerprint and providing an advantage of small noise to the sensor 200 for detecting the fingerprint.

With the sensor 200 for detecting the fingerprint according to embodiments of the present disclosure, by using the conductive layer 230, the sensing capacitance $C_x$ is formed between the conductive layer 230 and the finger 5 when the finger 5 is close to the detecting panel 210. When the finger 5 is closer and closer to the detecting region 220, the sensing capacitance $C_x$ formed between the conductive layer 230 and the finger 5 becomes larger and larger. Therefore, the distance between the finger 5 and the plurality of detecting units 221 is determined according to the change trend of the sensing capacitance $C_x$. When the distance between the finger 5 and the plurality of detecting units 221 is small, there is an intention for scanning the fingerprint of the finger 5 by the sensor 200 and the plurality of detecting units 221 are controlled to scan the fingerprint; when the distance between the finger 5 and the plurality of detecting units 221 is large, the plurality of detecting units 221 are controlled to stop scanning, which can effectively reduce the working timing of the plurality of detecting units 221 and reduce the power consumption of the detecting units 221, and thus the sensor 200 has the advantages of the low power consumption, energy-saving, and the high detection accuracy.

Figure 5:
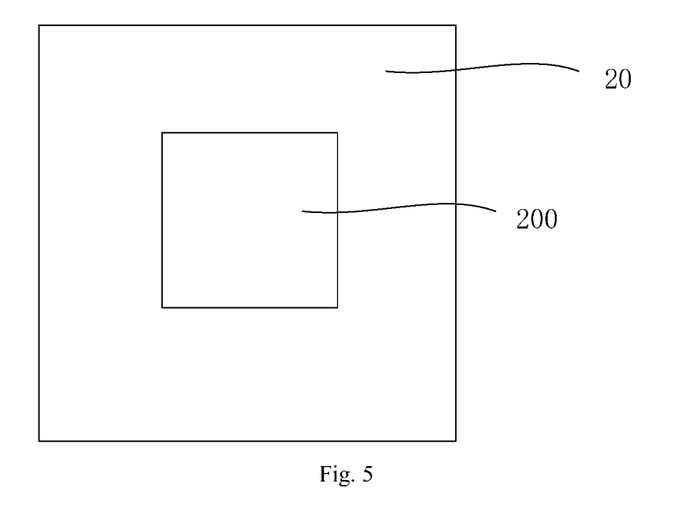
FIG. 5 is a block diagram of a fingerprint identification apparatus according to an embodiment of the present disclosure.

FIG. 5 is a block diagram of a fingerprint identification apparatus according to an embodiment of the present disclosure. As shown in FIG. 5, the fingerprint identification apparatus 20 includes a sensor 200 for detecting the fingerprint according to above embodiments of the present disclosure.

With the fingerprint identification apparatus 20 according to embodiments of the present disclosure, by using the conductive layer 230, the sensing capacitance $C_x$ is formed between the conductive layer 230 and the finger 5 when the finger 5 is close to the detecting panel 210. When the finger 5 is closer and closer to the detecting region 220, the sensing capacitance $C_x$ formed between the conductive layer 230 and the finger 5 becomes larger and larger. Therefore, the distance between the finger 5 and the plurality of detecting units 221 is determined according to the change trend of the sensing capacitance $C_x$. When the distance between the finger 5 and the plurality of detecting units 221 is small, there is an intention for scanning the fingerprint of the finger 5 by the sensor 200 and the plurality of detecting units 221 are controlled to scan the fingerprint; when the distance between the finger 5 and the plurality of detecting units 221 is large, the plurality of detecting units 221 are controlled to stop scanning, which can effectively reduce the working timing of the plurality of detecting units 221 and reduce the power consumption of the detecting units 221, and thus the sensor 200 has the advantages of the low power consumption, energy-saving, and the high detection accuracy.

Figure 6:
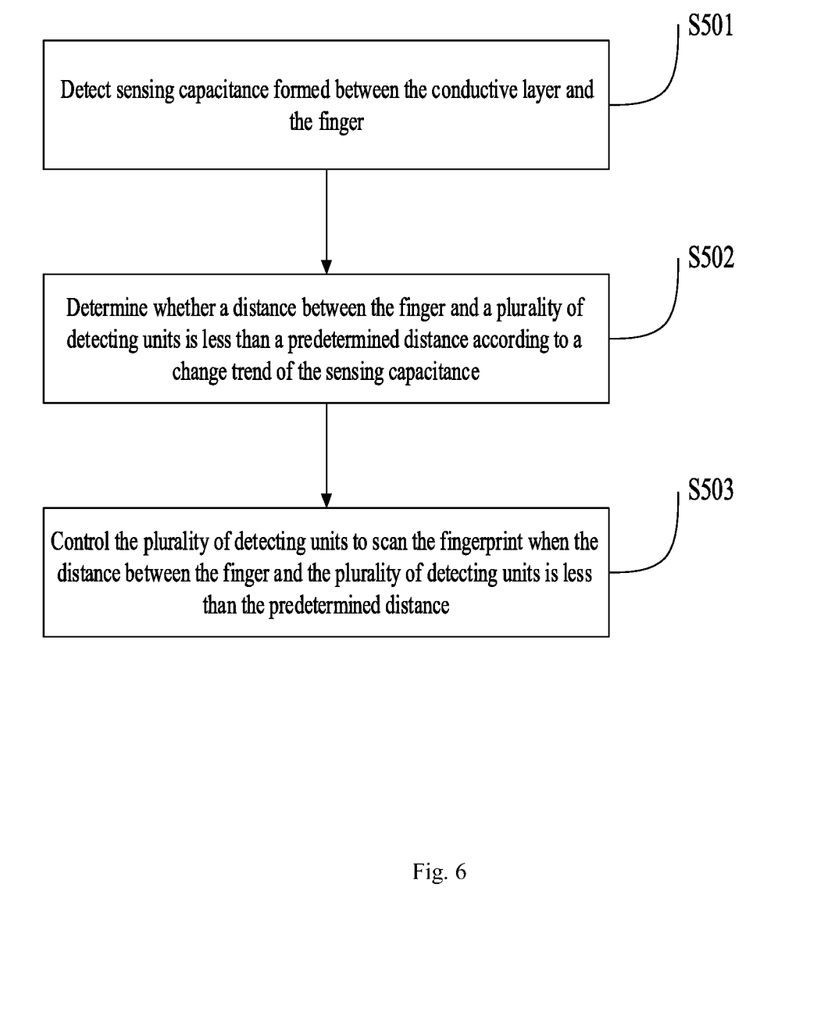
FIG. 6 is a flow chart of a controlling method of a sensor for detecting a fingerprint according to an embodiment of the present disclosure.

FIG. 6 is a flow chart of a controlling method of a sensor for detecting a fingerprint according to an embodiment of the present disclosure. As shown in FIG. 6, the controlling method of a sensor for detecting a fingerprint includes following steps.

At step 501, a sensing capacitance formed between a conductive layer and a finger is detected.

As shown in FIGS. 2-4, according to a human model, a finger, equal to a ground potential (GND), is configured as an upper plate electrode of a sensing capacitance $C_x$, and the conductive layer under or around the detecting region is configured as a lower plate electrode of the sensing capacitance $C_x$. When there is no finger above the detecting region, the sensing capacitance $C_x$ tends to be infinitely small; when the finger is close to the detecting region, the sensing capacitor $C_x$ is formed between the finger and the conductive layer.

At step 502, whether a distance between the finger and a plurality of detecting units is less than a predetermined threshold is determined according to a change trend of the sensing capacitance.

In an embodiment of the present disclosure, it may be determined whether the distance between the finger and the plurality of detecting units is less than the predetermined threshold by detecting changes of the sensing capacitance $C_x$ by a capacitance detecting module, i.e., it may be determined whether the finger is close to the detecting region by detecting changes of the sensing capacitance $C_x$ by the capacitance detecting module.

Specifically, the sensing capacitance $C_x$ is detected only by a conductive layer and the capacitance detecting module (e.g., the capacitance detecting module is implemented by a detecting circuit). Moreover, since the sensing capacitance is in inverse proportion to the distance between the finger and the plurality of detecting units, it is determined whether the finger is closer and closer to the detecting region according to the change trend of sensing capacitance $C_x$, i.e., it is determined whether to detect the fingerprint by the fingerprint detection region according to the change trend of sensing capacitance $C_x$.

At step 503, the plurality of detecting units are controlled to scan the fingerprint when the distance between the finger and the plurality of detecting units is less than the predetermined threshold.

Specifically, when the finger is closer and closer to the detecting region, for example when the distance between the finger and the plurality of detecting units is less than the predetermined threshold (e.g. 1 cm), the fingerprint is detected by the detecting region.

In some embodiments, the plurality of detecting units are controlled to stop scanning, when it is determined that the distance between the finger and the plurality of detecting units is larger than or equal to the predetermined threshold (e.g. 1 cm).

As shown in FIGS. 2-4, in order to improve a detection accuracy of the controlling method of the sensor for detecting the fingerprint, the conductive layer is controlled to be grounded (GND) or to be connected with a predetermined potential, when the distance between the finger and the plurality of detecting units is less than the predetermined threshold (e.g. 1 cm), which isolates and shields the detecting region and reduces interferences to the detecting region from external signals, thus enhancing the detection accuracy of controlling method of the sensor for detecting the fingerprint.

In an embodiment of the present disclosure, as shown in FIG. 2, in order to isolate and shield the detecting region effectively by the conductive layer, the conductive layer is disposed around the detecting region.

Specifically, the conductive layer is distributed around the detecting region, when the finger is located above the detecting region, the sensing capacitance $C_x$ is formed between the finger and the conductive layer, and thus it is determined whether the finger is located above the detecting region by detecting the sensing capacitance $C_x$.

From the above, the conductive layer is distributed around the detecting region, so that the conductive layer may be connected to a fixed potential (e.g. to be grounded or to be connected with the predetermined potential), when the detecting region is controlled to scan the fingerprint, which can isolate and shield the detecting region and reduce the interferences to the detecting region from the external signals, thus enhancing the detection accuracy of the controlling method of the sensor for detecting the fingerprint.

In another embodiment of the present disclosure, as shown in FIG. 3, in order to isolate and shield the detecting region better, the conductive layer includes a plurality of conductive boxes distributed in the plurality of rows and columns, and each detecting unit is disposed in a corresponding conductive box.

In other words, since the conductive layer is distributed around each detecting unit of the entire detecting region, the conductive layer is more sensitive to the sensing capacitance $C_x$ between the finger and the detecting panel, and the conductive layer may be connected to a fixed potential (e.g. to be grounded or to be connected with the predetermined potential) when the detecting region is controlled to scan the fingerprint. Moreover, because the conductive layer is distributed around each detecting unit, the detecting region may not only be shielded against the interferences from the external signals, but also be shielded against interferences from adjacent detecting units, thus enhancing the detection accuracy of the controlling method of the sensor for detecting the fingerprint and providing an advantage of small noise to the method of controlling the sensor for detecting the fingerprint.

With the method of controlling the sensor for detecting the fingerprint according to embodiments of the present disclosure, by using the conductive layer, the sensing capacitance is formed between the conductive layer and the finger when the finger is close to the detecting panel. When the finger is closer and closer to the detecting region, the sensing capacitance formed between the conductive layer and the finger becomes larger and larger. Therefore, the distance between the finger and the plurality of detecting units is determined according to the change trend of the sensing capacitance. When the distance between the finger and the plurality of detecting units is small, there is an intention for scanning the fingerprint of the finger by the sensor and the plurality of detecting units are controlled to scan the fingerprint, when the distance between the finger and the plurality of detecting units is large, the plurality of detecting units are controlled to stop scanning, which can effectively reduce the working times of the plurality of detecting units and reduce the power consumption of the detecting units, thus providing the advantages of the low power consumption, energy-saving, and the high detection accuracy.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in an almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that aspects of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:
1. A sensor for detecting a fingerprint, comprising:
    a detecting panel, comprising:
        a detecting region with a plurality of detecting units, wherein the plurality of detecting units are distributed in a plurality of rows and columns in the detecting region; and
        a conductive layer, configured to form a sensing capacitance between the conductive layer and a finger when the finger is close to the detecting region;
    a capacitance detecting module, configured to detect the sensing capacitance; and
    a control module, connected with the plurality of detecting units, the conductive layer and the capacitance detecting module respectively and configured to:
        determine whether a distance between the finger and the plurality of detecting units is less than a predetermined threshold according to a change trend of the sensing capacitance; and
        control the plurality of detecting units to scan the fingerprint when the distance between the finger and the plurality of detecting units is less than the predetermined threshold.

2. The sensor according to claim 1, wherein the control module is further configured to control the conductive layer to be grounded or to be connected with a predetermined potential when the distance between the finger and the plurality of detecting units is less than the predetermined threshold.

3. The sensor according to claim 1, wherein the control module is further configured to control the plurality of detecting units to stop scanning when the distance between the finger and the plurality of detecting units is larger than or equal to the predetermined threshold.

4. The sensor according to claim 1, wherein the conductive layer is disposed around the detecting region.

5. The sensor according to claim 1, wherein the conductive layer comprises a plurality of conductive boxes distributed in a plurality of rows and columns, wherein each detecting unit is disposed in a corresponding conductive box.

6. The sensor according to claim 1, wherein the sensing capacitance is in inverse proportion to the distance between the finger and the plurality of detecting units.

7. A fingerprint identification apparatus, comprising:
a detecting panel, comprising:
a detecting region with a plurality of detecting units, wherein the plurality of detecting units are distributed in a plurality of rows and columns in the detecting region; and
a conductive layer, configured to form a sensing capacitance between the conductive layer and a finger when the finger is close to the detecting region;
a capacitance detecting module, configured to detect the sensing capacitance; and
a control module, connected with the plurality of detecting units, the conductive layer and the capacitance detecting module respectively and configured to:
determine whether a distance between the finger and the plurality of detecting units is less than a predetermined threshold according to a change trend of the sensing capacitance; and
control the plurality of detecting units to scan the fingerprint when the distance between the finger and the plurality of detecting units is less than the predetermined threshold.

8. The fingerprint identification apparatus according to claim 7, wherein the control module is further configured to control the conductive layer to be grounded or to be connected with a predetermined potential when the distance between the finger and the plurality of detecting units is less than the predetermined threshold.

9. The fingerprint identification apparatus according to claim 7, wherein the control module is further configured to control the plurality of detecting units to stop scanning when the distance between the finger and the plurality of detecting units is larger than or equal to the predetermined threshold.

10. The fingerprint identification apparatus according to claim 7, wherein the conductive layer is disposed around the detecting region.

11. The fingerprint identification apparatus according to claim 7, wherein the conductive layer comprises a plurality of conductive boxes distributed in a plurality of rows and columns, wherein each detecting unit is disposed in a corresponding conductive box.

12. The fingerprint identification apparatus according to claim 7, wherein the sensing capacitance is in inverse proportion to the distance between the finger and the plurality of detecting units.

13. A method of controlling a sensor for detecting a fingerprint, comprising:
detecting a sensing capacitance formed between a conductive layer and a finger;
determining whether a distance between the finger and a plurality of detecting units is less than a predetermined threshold according to a change trend of the sensing capacitance, wherein the sensing capacitance is in inverse proportion to the distance between the finger and the plurality of detecting units; and
controlling the plurality of detecting units to scan the fingerprint when the distance between the finger and the plurality of detecting units is less than the predetermined threshold.

14. The method according to claim 13, further comprising:
controlling the conductive layer to be grounded or to be connected with a predetermined potential when the distance between the finger and the plurality of detecting units is less than the predetermined threshold.

15. The method according to claim 13, further comprising:
controlling the plurality of detecting units to stop scanning when the distance between the finger and the plurality of detecting units is larger than or equal to the predetermined threshold.

16. The method according to claim 13, wherein the conductive layer is disposed around the detecting region.

17. The method according to claim 13, wherein the conductive layer comprises a plurality of conductive boxes distributed in a plurality of rows and columns, wherein each detecting unit is disposed in a corresponding conductive box.

* * * * *